Dec. 4, 1928.
E. E. HOLLE
1,693,605
MACHINE FOR SLICING CHEESE
Filed Nov. 19, 1927　　2 Sheets-Sheet 1
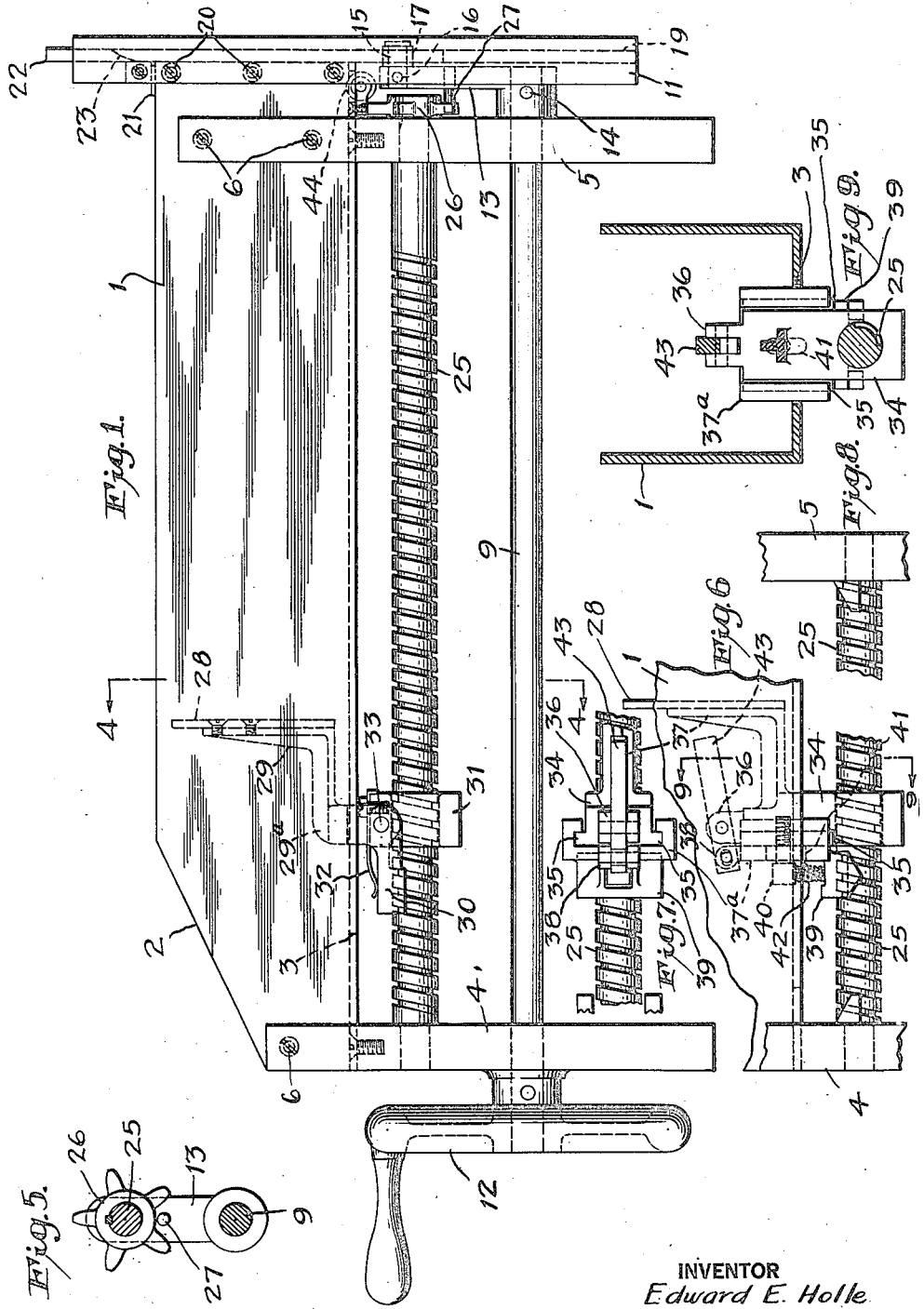
INVENTOR
Edward E. Holle
BY
HIS ATTORNEY

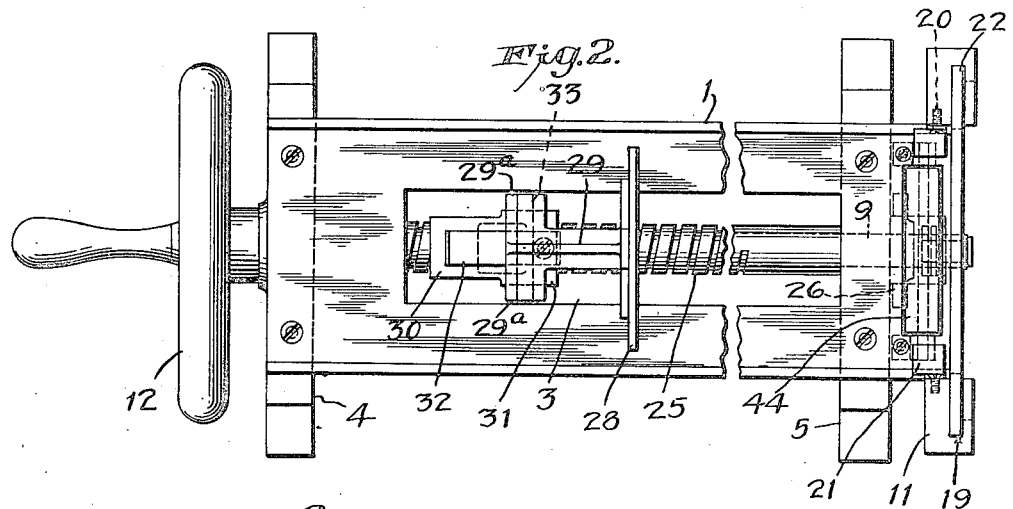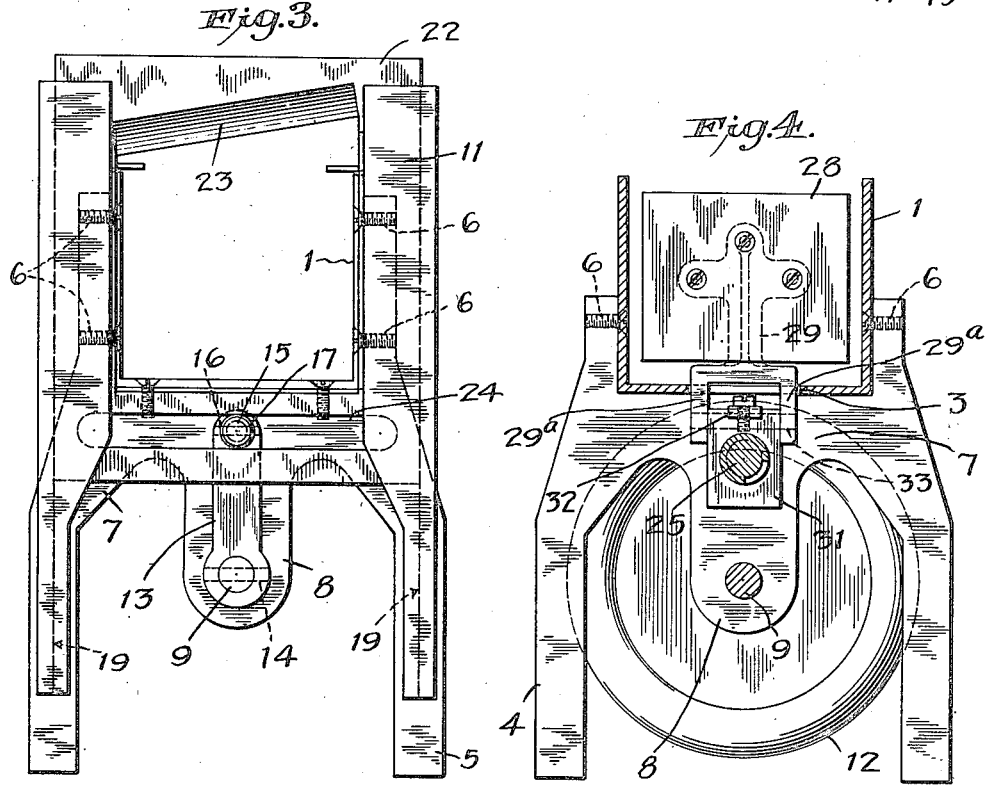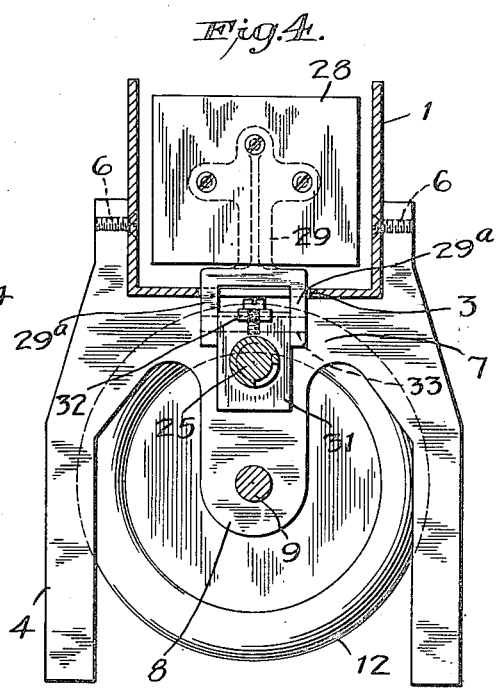

Patented Dec. 4, 1928.

1,693,605

UNITED STATES PATENT OFFICE.

EDWARD E. HOLLE, OF ARLINGTON, NEW JERSEY.

MACHINE FOR SLICING CHEESE.

Application filed November 19, 1927. Serial No. 234,372.

My invention relates to a machine for slicing cheese and more particularly to such a machine provided with simple means whereby the cheese may be cut in slices of predetermined, unvarying, thickness.

One of the objects of my invention is to provide a cheese slicing machine in which the cutter frame and its blade is arranged to reciprocate in a fixed vertical plane, and in which the means for reciprocating the cutter, also operates means whereby the cheese is advanced a predetermined, unvarying distance, following each cutting operation, after the cutter blade has been returned above the path of travel of the cheese.

Another object of the invention is to provide a pusher, for advancing the cheese to be cut, with means for normally holding it in engagement with its feeding means, the said means being releasable, so that the pusher may be easily returned to its original feeding position.

Another object of the invention is to provide a machine for carrying out these objects capable of easy operation, the parts of the machine being of simple and firm construction, avoiding a multiplicity of springs and other delicate mechanism and to so arrange the parts that economy of space is obtained.

With the above and other objects in view, my invention consists in the parts, improvements and combinations more fully pointed out hereinafter.

Turning now to the drawings:

Figure 1, is a side elevation of the machine, showing the continuously rotating drive shaft, the intermittently rotated screw shaft, and the pusher.

Figure 2, is a top plan view showing the slotted, stationary trough, the screw shaft and the pusher adapted to travel along the trough.

Figure 3, is an end elevation, showing the trough, and the means for reciprocating the cutter frame and blade in a fixed vertical plane.

Figure 4, is a vertical cross-section taken on line 4—4 of Figure 1.

Figure 5, is a detail view showing the means for intermittently rotating the screw shaft.

Figure 6, illustrates a modified form of pusher.

Figure 7, is a plan view of the pusher shown in Figure 6.

Figure 8, is a detail view showing the means provided at the ends of the screw shaft for avoiding locking of the pusher shown in Figure 6, and Figure 9, is a cross-sectional detail view of the pusher shown in Figure 6, showing it in place in the trough.

Referring now to the drawings, my cheese slicing machine is provided with a stationary trough 1 (see Figures 1, 4 and 6), adapted to receive the cheese to be sliced. The trough is shown preferably beveled at one end, as at 2, to facilitate the placing of the cheese therein. In the form of the invention illustrated, the trough 1 is U-shaped, and is provided with a longitudinally extending slot as at 3 (see Figure 2). The trough is mounted above the floor by means of a pair of legs 4, at the rear and a pair of legs 5, at the forward end. The legs of each pair extend upward on opposite sides of the trough 1, and the trough is secured to the legs by means of screws 6. The screws are shown countersunk in the trough, and threaded home in the legs, thus firmly securing the trough to the legs. Each pair of legs 4, 5, is connected below the trough by means of connecting piece 7 each carrying a depending flange 8.

As illustrated, a continuously rotating drive shaft 9 is provided. This shaft passes through the depending flanges 8 and is supported thereby, below and longitudinally of the trough. Shaft 9 is adapted to be continuously rotated as by means of handwheel 12 mounted on the rear end of the shaft. At its forward end (see Figure 1), shaft 9, carries the crank 13, fixed thereto by a pin 14. The distal end of the crank carries a stud 15 pinned to the crank by pin 16, on which stud is mounted roller 17.

Means are provided for reciprocating the cutter frame and blade in a fixed vertical plane and for advancing the pusher and cheese a predetermined, unvarying distance, after each cutting operation, and after the cutter blade has been returned above the path of travel of the advancing cheese.

In the form of the invention illustrated, a guide frame 11, having guideways 19, is provided at the forward end of trough 1. The guide frame extends substantially above and below the trough and is secured thereto as by means of screws 20, and carries a crossbar 21, resting across the sides of the trough. Mounted in the guide frame and adapted to travel in the vertical guideways 19, is a cutter frame 22. The cutter frame extends above and below trough 1, and in its upper portion has fixedly mounted a cutter blade 23, preferably a guillotine blade. The lower portion of the cutter frame 22, is provided with a transverse slot, as at 24, with which the roller 17 of the crank 13, actuated by the drive shaft, engages. The cutter frame and its blade may thus be directly reciprocated by crank 13 in guideways 19, in a fixed vertical plane.

As shown a screw shaft 25, is provided, preferably parallel to the drive shaft and mounted between the shaft and trough, in line with the slot in the trough. The screw shaft is turned down at each end and is mounted in and supported by the flanges 8. At its forward end the screw shaft has fixed to it a star wheel 26, which is engaged and turned by pin 27 on crank 13. A pusher 28, adapted to contact with the cheese and push it forward is suitably connected to the screw shaft 25.

It will be observed that crank 13 with its roller 17, operates to reciprocate the cutter frame and blade as described and that the pin 27 on the crank, engages one of the fingers of star wheel 26, on each upward movement of the crank, so as to intermittently rotate the screw shaft a part of a revolution, and advance the pusher and cheese, after the cutter blade has been returned above the path of travel of the cheese. By mounting the drive and screw shafts below the trough, the shafts are not exposed and a saving of counter space is obtained. The provision of a slotted lower portion for the cutter frame enables the crank on the drive shaft below the trough, to be directly connected to and reciprocate the cutter frame and blade from below the trough, thus avoiding a multiplicity of working parts.

Means are provided, connected to the pusher, for engaging the screw shaft, the said means, normally held in firm engagement with the screw shaft, being releasable so as to permit the pusher to be returned without backward rotation of the screw shaft.

In the form of the invention illustrated in Figures 1 to 5, these means comprise a casting 29, having arms 29ª, projecting through the slot in trough 1, and terminating in a tailpiece member 30. The tailpiece member 30, is screw-threaded to engage the screw shaft 25. As shown, screw shaft 25, carries an apertured block 31, which loosely surrounds the screw shaft. Screwed to block 31, is a spring 32, which bears against the tailpiece 30 of the casting, so as to press it into engagement with the screw shaft, the spring 32 thus causing the tailpiece 30 to coact with the screw shaft 25 so as to advance the block 31 when the screw shaft is rotated in the proper direction. A pivot pin 33, passing through the arms of the casting and the block 31, pivotally secures the arms to the block. After the pusher has completed its feeding operation, it may be grasped and tilted, about the pivot, so as to release the tailpiece of the casting from the screw shaft. The pusher may then be returned to its original position.

In Figures 6 to 9, a modified form of pusher connection to the screw shaft is shown.

As illustrated in these figures, the apertured block 34, loosely surrounding the screw shaft, is provided with vertical ribs 35, and an ear 36. The block 34 projects through the slot 3 and has the arm 37 formed integral therewith, the arm 37 carrying the pusher 28. Mounted for vertical movement on the block 34 and guided by the ribs 35 is a slide 37ª. The upper part of the slide 37ª carries an ear 38 and the lower part terminates in a tailpiece 39 which is screw threaded to engage the screw shaft 25. A square headed set screw 40 passes through a slot 41 in the slide 37ª and a spring 42 confined between the head of the set screw 40 and the tailpiece 39 normally causes the tailpiece to engage the screw shaft. A lever 43, is provided pivotally secured to ear 38 of the slide 37ª and ear 36 of the block. By pressing down on the lever, casting 37ª will be moved upward and its tailpiece will be freed from engagement with the screw shaft, without tilting the pusher, and the pusher returned to its original position.

In the slot in the forward end of the trough, there may be mounted an idle roller 44, to aid in feeding the cheese to the cutter blade.

My cheese slicing machine is of simple and firm construction, avoids delicate mechanism and is capable of easy operation.

After the cheese to be sliced is placed in the trough 1, and pusher 28 is brought to bear against it, hand wheel 12 is turned to rotate shaft 9 continuously. Crank 13 turning with the shaft causes its roller 17 to travel in the slot in the cutter frame. The cutter frame and its blade are brought down in guideways 19 and cut the cheese. Shaft 9 and crank 13, continuing to turn reciprocate the cutter frame and blade upward in its fixed vertical plane, the up and down movement of the cutter frame and blade always occurring in one fixed vertical plane. As crank 13 nears the completion of its upstroke and after it has returned the cutter blade above the path of travel of the cheese in the trough, the pin 27 on the crank will engage one of the fingers of star wheel 26 and rotate the star wheel and screw shaft a part of a revolution each time and so advance the pusher and cheese, the same predetermined distance after each slicing operation.

Having thus described the invention and its operation, it will be understood that changes may be made in carrying the invention into effect, without departing from the principle thereof.

What I claim is:

1. A machine for slicing cheese comprising in combination, a stationary trough, a pusher mounted in said trough and adapted to travel longitudinally thereof, a cutter frame mounted at one end of said trough and extending above and below the trough, a cutter blade mounted in the upper portion of said frame, a drive shaft mounted below and extending longitudinally of said trough, means carried by said shaft engaging the cutter frame below the trough for reciprocating the frame and blade from below the trough, and means operable by said cutter reciprocating means for intermittently advancing the pusher a predetermined distance.

2. A machine for slicing cheese comprising in combination, a stationary trough, a pusher mounted in said trough, a cutter frame mounted at one end of said trough, a cutter blade in said frame, said frame having a slotted lower portion extending below the trough, guides for guiding the cutter frame and blade in a fixed vertical plane, a drive shaft mounted below and extending longitudinally of said trough, a crank carried by the drive shaft, a roller carried by the crank and engaging the slot in the cutter frame so as to reciprocate the frame and blade from below the trough, and means operable by said crank for advancing the pusher a predetermined distance after the cutter blade has returned above the path of travel of the cheese.

3. A machine for slicing cheese comprising in combination, a stationary trough, a pusher mounted in said trough, a cutter frame mounted at one end and having a slotted portion extending below the trough, a cutter blade mounted in said frame, a drive shaft mounted below and extending longitudinally of said trough, a crank carried by the drive shaft, a roller carried by the crank and engaging the slot in the cutter frame so as to reciprocate the frame and blade from below the trough, a screw shaft mounted between the drive shaft and trough, means operable by the crank on said drive shaft for turning the screw shaft and means engaging said screw shaft and connected to said pusher for advancing the pusher a predetermined distance after the cutter blade has passed above the path of travel of the cheese.

4. A machine for slicing cheese comprising in combination a stationary trough provided with a longitudinal slot, a pusher mounted in said trough, a cutter frame and cutter blade, arranged to reciprocate in a fixed vertical plane, a continuously rotating drive shaft mounted below said trough, a screw shaft between the drive shaft and trough, means connected to said pusher projecting through the slot in the trough and releasably engaging the screw shaft, a crank carried by the drive shaft for reciprocating the cutter frame and blade in their fixed vertical plane, and means operable by said crank for intermittently turning the screw shaft so as to advance the pusher.

5. A machine for slicing cheese comprising in combination, a slotted trough, a pusher mounted in and adapted to travel longitudinally of said trough, a cutter frame, provided with a blade, mounted at one end of said trough, a continuously rotating drive shaft extending below and longitudinally of said trough, means carried by said drive shaft engaging and adapted to reciprocate said cutter frame and means operable by the cutter reciprocating means for intermittently advancing the pusher.

6. A machine for slicing cheese comprising in combination, a stationary trough, a pusher mounted in and adapted to travel longitudinally of said trough, a cutter frame, having a blade, mounted at one end of said trough, a drive shaft mounted below and longitudinally of said trough, a crank carried by said drive shaft and engaging said cutter frame below the trough, so as to reciprocate the frame and blade from below the trough and means for intermittently advancing the pusher.

7. A machine for slicing cheese comprising in combination, a stationary trough, a pusher mounted in said trough, a guide frame, a cutter frame mounted in said guide frame provided with a cutter blade and with a slotted portion extending below said trough, a continuously rotating drive shaft mounted below said trough, a crank secured to said drive shaft and having a roller engaging the slot in said frame for reciprocating the cutter frame and blade in the guide frame in a fixed vertical plane, a screw shaft mounted between the drive shaft and trough and parallel thereto, means engaging said screw shaft and connected to said pusher for advancing the pusher, a star wheel carried by the screw shaft, a pin on said crank for engaging the star wheel, whereby the star wheel may be turned to advance the pusher after the cutter blade has passed above the path of travel of the cheese.

In testimony whereof I affix my signature.

EDWARD E. HOLLE.